(12) United States Patent
Harvey et al.

(10) Patent No.: US 7,799,254 B2
(45) Date of Patent: Sep. 21, 2010

(54) METHOD FOR THE TREATING FILMS

(75) Inventors: Erol Craig Harvey, Ringwood North (AU); Ramon Glenny Waycott, Donvale (AU); David Lee Carew, St. Albans (AU)

(73) Assignee: AMCOR Packaging (Australia) Pty (AU)

( * ) Notice: Subject to any disclaimer, the term of this patent is extended or adjusted under 35 U.S.C. 154(b) by 0 days.

(21) Appl. No.: 10/432,337

(22) PCT Filed: Nov. 20, 2001

(86) PCT No.: PCT/AU01/01503

§ 371 (c)(1),
(2), (4) Date: Oct. 27, 2003

(87) PCT Pub. No.: WO02/40250

PCT Pub. Date: May 23, 2002

(65) Prior Publication Data

US 2004/0126531 A1    Jul. 1, 2004

(30) Foreign Application Priority Data

Nov. 20, 2000    (AU) .................................... PR1583

(51) Int. Cl.
*B29C 43/46*    (2006.01)
*B29C 33/38*    (2006.01)

(52) U.S. Cl. ........................ 264/156; 264/280

(58) Field of Classification Search .................. 264/74, 264/219, 227, 245, 255, 446, 155, 156, 280
See application file for complete search history.

(56) References Cited

U.S. PATENT DOCUMENTS

| 2,699,208 | A | * | 1/1955 | Schur ........................... 83/168 |
| 3,085,608 | A | * | 4/1963 | Mathues ....................... 383/103 |
| 3,097,787 | A | * | 7/1963 | Schur ........................... 383/94 |
| 3,682,028 | A |   | 8/1972 | Clayton |
| 3,812,002 | A | * | 5/1974 | Lurie .............................. 428/43 |
| 3,872,194 | A | * | 3/1975 | Lowry et al. ................. 264/470 |
| 3,881,489 | A | * | 5/1975 | Hartwell ...................... 604/369 |
| 3,911,187 | A | * | 10/1975 | Raley ........................... 428/180 |
| 4,211,743 | A | * | 7/1980 | Nauta et al. .................. 264/284 |
| 4,319,868 | A | * | 3/1982 | Riemersma et al. ......... 425/290 |
| 4,496,216 | A |   | 1/1985 | Cowan |
| 4,636,417 | A | * | 1/1987 | Rasmussen ................... 428/91 |
| 4,652,412 | A |   | 3/1987 | Chiulli |
| 4,778,644 | A | * | 10/1988 | Curro et al. .................. 264/557 |
| 4,861,529 | A | * | 8/1989 | Groebli et al. ............. 264/40.1 |

(Continued)

FOREIGN PATENT DOCUMENTS

EP    0 718 088 A2    6/1996

(Continued)

*Primary Examiner*—Matthew J. Daniels
(74) *Attorney, Agent, or Firm*—Ballard Spahr LLP

(57) ABSTRACT

A method for treating a film by providing a structure including a substrate and an array of upstanding projections each of which includes multiple contact points. The structure is pressed against the surface of a polymeric film to cause deformation or rupture of the film. The film may then be pressed to partially reseal the perforations. The structure can be produced by electroplating a mould which includes an array of elements of dimensions corresponding to the projections of the desired structure.

24 Claims, 16 Drawing Sheets

U.S. PATENT DOCUMENTS

| | | | |
|---|---|---|---|
| 4,886,632 A * | 12/1989 | Van Iten et al. | 264/156 |
| 5,158,819 A | 10/1992 | Perry et al. | |
| 5,386,752 A | 2/1995 | Siegel | |
| 5,637,105 A * | 6/1997 | Tanaka et al. | 604/368 |
| 5,667,864 A * | 9/1997 | Landoll | 428/74 |
| 5,681,301 A * | 10/1997 | Yang et al. | 604/370 |
| 5,709,829 A | 1/1998 | Giacometti | |
| 5,863,312 A | 1/1999 | Wolfe | |
| 2003/0085213 A1 | 5/2003 | Burckhardt et al. | |

FOREIGN PATENT DOCUMENTS

| | | |
|---|---|---|
| EP | 0 881 025 A1 | 12/1998 |
| EP | 1 048 419 A | 11/2000 |
| GB | 1120578 | 7/1968 |
| GB | 2 329 606 | 3/1999 |
| JP | 61-084228 A | 4/1986 |
| JP | 86-148244 | 4/1986 |
| JP | 89-344401 | 4/1988 |
| JP | 01-256956 A | 10/1989 |
| JP | 07-144364 A | 6/1995 |
| JP | 09001660 A | 6/1995 |
| JP | 11105141 A | 4/1997 |
| JP | 10-094357 | 4/1998 |
| JP | 11350181 A | 10/1998 |
| JP | 11-222257 | 8/1999 |
| WO | WO 92/00798 | 1/1992 |
| WO | WO 99/48653 | 9/1999 |

* cited by examiner

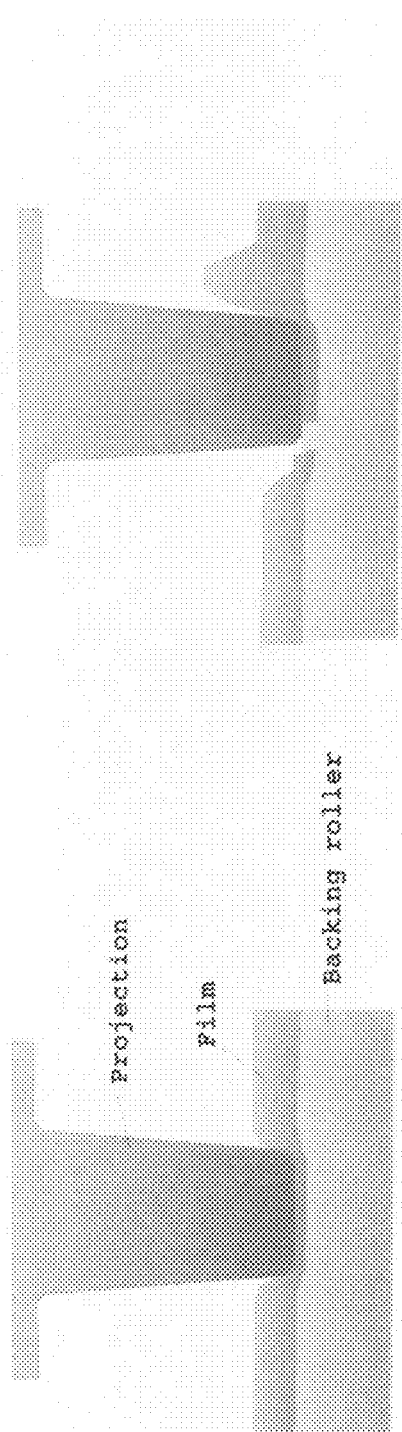
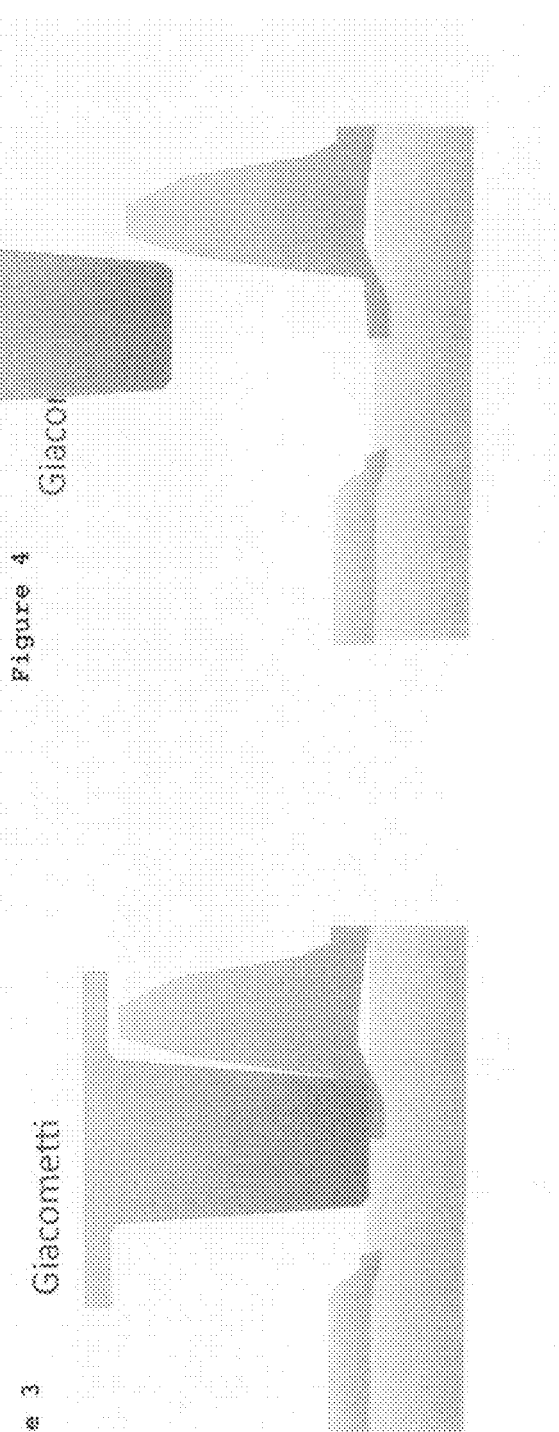
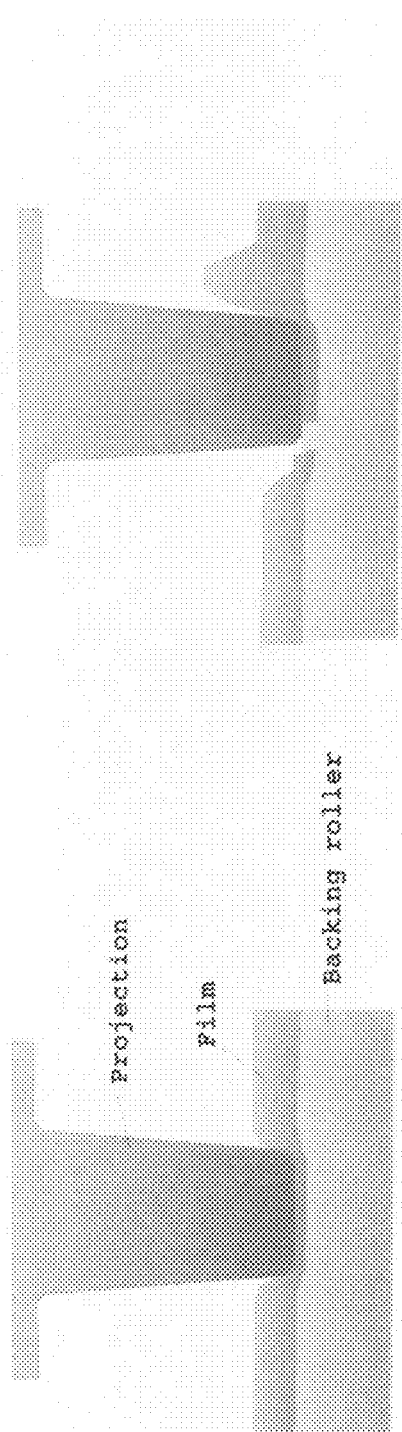
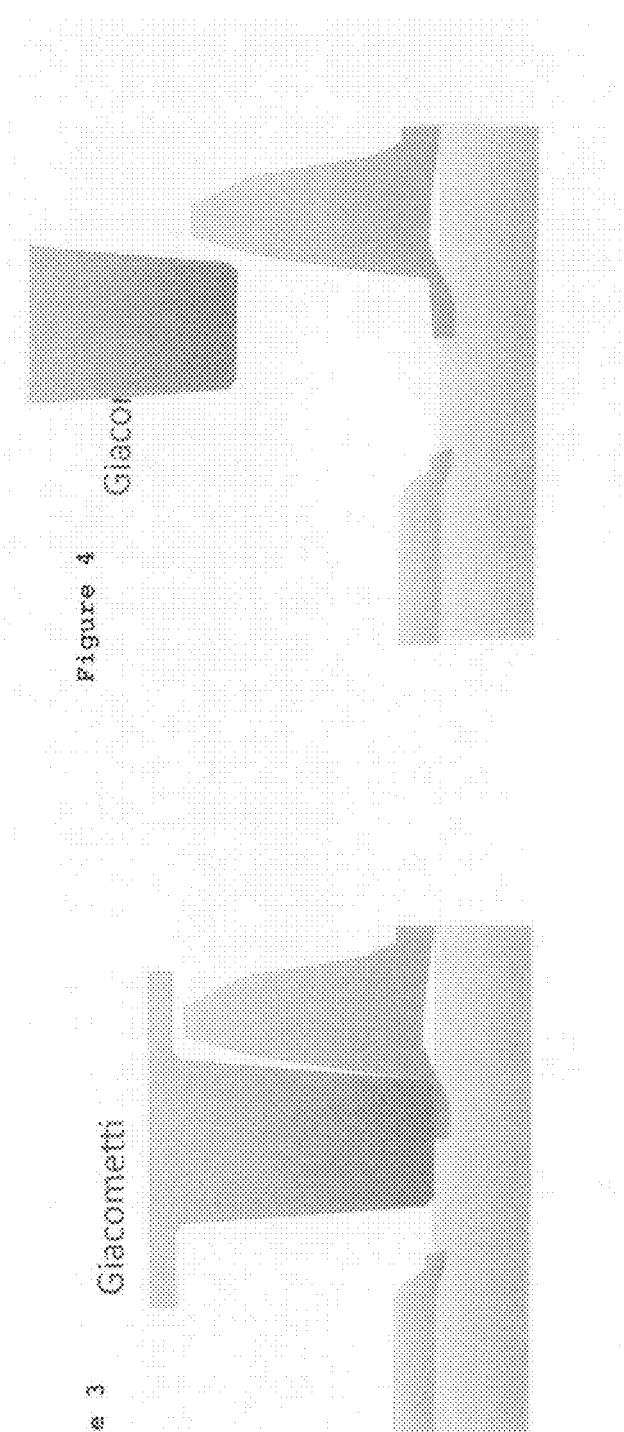
Figure 1
Figure 2
Figure 3
Figure 4

SE surface image, 62 degree tilt. (image021.jpg)

METHOD FOR THE TREATING FILMS

CROSS REFERENCE TO RELATED APPLICATIONS

The present application claims priority to Australian Patent Application No. PR 1583, filed Nov. 20, 2000, which application is incorporated herein fully by this reference.

The present invention relates to methods for treating films such as polymeric films for a variety of purposes. The treatment technique involves the formation of very small deformations or ruptures (perforations) in the film to form treated films suitable for use as breathable films or controlled tearing films.

Polymeric films for use in the packaging of food products are sometimes subjected to perforating treatments to form a "breathable" or "controlled atmosphere" food packaging. The perforations in such films are most commonly formed by mechanical perforating methods. Whilst these methods are capable of forming perforations of a reasonably uniform size, the known methods cannot be used to form very small perforations (for example less than 25 μm in diameter). Perforations at least as small as 25 μm in diameter are required to produce films that allow different gases (such as $O_2$ and $CO_2$) to pass across the film barrier into or out of a package at different rates. Such controlled atmosphere packaging made with these films is advantageous in extending the shelf life of food products.

In other industries, for example the clothing industry, materials such as fabrics are available which provide breathability. However, these materials and techniques for manufacturing these materials are not appropriate for the manufacture of low-cost polymeric films for use in the food packaging or in the production of sanitary products such as diapers.

One of the main difficulties associated with forming perforations of less than 25 μm in diameter is the difficulty in forming a structure having spikes less than 25 μm in diameter. Accordingly, a number of proposals have been put forward that involve the use of laser radiation to form very small perforations in polymeric films. However, these techniques have also encountered a number of problems that principally relate to the time taken for laser irradiation to create the holes through the full film thickness. These drawbacks currently make it infeasible for laser to be used to create minute perforations in low cost, high production speed polymeric films.

During the course of investigating the problem of creating low-cost breathable films, the applicant has also identified other adverse characteristics of polymeric films that may be compensated for by different treatment techniques. One such characteristic is the difficulty in tearing biaxially oriented films in a controlled manner.

The applicant has now developed new techniques for treating films to form very small deformations or ruptures in the film. These techniques make it possible to create breathable films or controlled-tearing films at high production speeds. These techniques may also be applied to the formation of breathable fabrics based on the films prepared in accordance with the present invention.

According to the present invention there is provided a method for treating a film, comprising:

providing a web of polymeric film having a front face and a reverse face, providing a structure including a substrate and an array of upstanding projections, each projection including multiple contact points, and pressing the projection-bearing surface of the structure into one face of the polymeric film a sufficient distance to fix the film against the contact points to cause deformation or rupture of the film.

The contact points of the projections may be described as being geometric features that provide a non-uniform pressure distribution across the film when pressed against the film. Rupture or deformation thereby occurs between the contact points. Since the pressure differences are greatest between the contact points of the one projection, a deformation or rupture (ie a perforation) is generated within the diameter of the perforation. When the projection is of a suitably small size, it becomes possible to create microperforations or microdeformations in the film. Accordingly, in a preferred embodiment, the projections includes contact points having a spacing less than 500 μm, preferably less than 250 μm, more preferably less than 150 μm and most preferably less than 100 μm.

It is to be noted that the contact points or geometric features may be of a wide range of configurations. Almost any shaped projection with the exception of "pinpoint" projections will have such contact points that create the non-uniform pressure distribution across the width of the projection. It is not necessary for the contact points to be constituted by a plurality of peaks of the projection. The projection may have a smooth upper profile and still contain contact points along this profile that cause rupture or perforation of the film between the contact points.

This treatment technique can be put to use to produce films having a variety of characteristics. For one example, a breathable or "controlled atmosphere" film can be produced by this method. If deformations or indentations are formed only, these leave a very thin layer of the film that divides one face of the polymeric film from the reverse face. This layer of film can be controlled to be small enough for different gases to diffuse at controlled rates across this very thin barrier. In addition, liquids may be prevented from passing through the film.

This technique can also be used to form a film such as a polymeric film that has controlled tearing characteristics. Specifically, the deformations or indentations can be formed in a line in the film, thereby providing a line of weakness in the film that enables the film to be torn along the line joining the deformations or indentations. If the indentations are formed that do not extend through the full thickness of the film, a product packaged in the film will not be exposed to the outside air. At the same time, the package can be opened with ease when torn along the line defined by the indentations.

The term "film" has been used in this specification in its broadest sense and includes single layer films, biaxially oriented polymeric films, composite films, multilayer films, coextruded films and laminates of polymeric films with layers of other materials, such as metal. The film treated by the method of the present invention may be laminated to another layer or layers following treatment of the film according to the present invention. Accordingly, a treated film may be laminated to another layer or layers following the formation of the line of weakness (tear-line) in the polymeric film.

In the case where the pressing step involves pressing the structure into the polymeric film a sufficient distance to rupture the film to form perforations in the film, the perforations can be controlled to be sufficiently small by controlling the pressure applied to the film against the structure. The perforation size, due to the configuration of the structure and the treatment technique, can be controlled such that the effective size of at least 80% of the perforations is less than 25 μm in diameter. In the art of the invention, the effective size of a perforation is measured by a MOCON oxygen transmission tester calibrated against a film with a perforation of the defined size. More preferably, the effective aperture size of at least 80% of the perforations formed in the film is less than or equal to 10 μm, as measured using the Mocon Oxygen transmission tester calibrated against a film of the defined size.

In an alternative embodiment of the invention the technique can be used to form deformations or indentations in the film. In one application of this embodiment, the indentations can be formed in a line to create a line of weakness in the film that enables the film to be torn along the line. To accomplish this, the film is pressed relatively lightly against the structure.

Preferably, the film is pressed between the structure and a backing form that pushes the film against the structure. The backing form preferably has an outer surface that is of an appropriate stiffness to force the projections into or through the film surface. Neoprene and rubberised elastomers are examples of suitable materials for forming the outer surface of the backing form. The stiffness of this backing form would usually be between 40 and 100 as measured by the Shore hardness test.

In most commercial situations the pressing step will be conducted as a continuous process. In this situation, the structure may be mounted onto, or in the form of, a roller or a platen. In the case of a roller, the pressing step may then involve passing the film between the roller form of the structure and a backing form in the shape of a backing roller. In the case of a platen, the platen may be a reciprocating platen including a structure on one plate and a backing plate. A combination of a platen with a roller is another option.

In a preferred embodiment of the invention, the penetrating strucure and the backing form are indexed or oscillate in either one or two axes perpendicular to the direction of penetration to maintain the pressure of application for an extended period as wear of the structures or backing material takes place. To further maintain the uniformity of the deformations or ruptures in the film over time, the structure preferably has a wear-consistent design. In other words, the cross-section of each projection should remain uniform through a significant portion of the height thereof.

In some situations it may be desirable to heat the film and/or the structure (in roller form or otherwise) to assist in the deformation or rupturing of the film.

The projections of the structure preferably have an average height of between 5 μm and 250 μm, more preferably between 10 μm and 200 μm, and most preferably between 10 μm and 100 μm.

The average maximum width dimension of the projections should be less than 1 mm. Usually the average maximum width dimension of the projections is less than 500 μm, preferably less than 250 μm, more preferably less than 200 μm, and most preferably less than 150 μm. In order to form perforations or deformations in the film as small as possible, an average maximum width dimension of less than 100 μm is particularly suitable.

The method outlined above may be utilised in a novel technique for the treatment of a thermoplastic polymeric film which involves:
 (a) providing a web of thermoplastic polymeric film;
 (b) rupturing the film to form perforations in the film; and
 (c) pressing the film to at least partially re-seal the perforations, or to modify the surface of the film.

In step (b), the film is ruptured in such a way that the polymeric material previously located in the position of the perforation is displaced but remains connected to and a part of the polymeric film. This is in distinct contrast to techniques for forming perforations in film that involve laser ablation of the material in the region of the perforation, or involve punching out a disc of the polymer film to leave a perforation in its place. As will be described below in further detail, the polymeric material is stretched, snaps, and recoils in a curled ribbon-like formation or fringe around the region of the perforation in the film. The pressing step d can be used to iron flat the recoiled plastic in the region of the perforations.

Preferably, the film is heated to a temperature greater than or equal to its softening point prior to or at the same time as the pressing step (c). The heating step could be conducted contemporaneously with the pressing step by passing the film between heated nip rollers. Alternatively the heating step could involve heating the film by hot air, infrared radiation or conduction to raise the film to the necessary temperature prior to step (d).

In one embodiment the treatment technique also includes a step in which the film is printed. The print is advantageously indexed with a tear-line generated by the treatment technique of the present invention.

The film surface can be modified by the techniques outlined above to vary the softness and texture of the film. As will be appreciated from closer inspection of the films depicted in the preferred embodiments, the films formed using the structures of the present invention may have a rough surface resulting from stretching and gouging of the film surface. Step (c) can therefore be used to flatten the film and to restore the smooth surface thereof.

This technique makes it possible to form perforations of a size greater than is required for a particular application in a first mechanical perforating step, followed by a re-sealing step in which these perforations are reduced in size to the final desired perforation size. Otherwise, the perforations may be eliminated entirely to leave a line of weakness in the film. Accordingly the perforations formed in the film by this technique can be made even smaller than can be obtained using the mechanical perforating technique alone. Nevertheless, the high production speeds required to form low-cost films can still be achieved.

According to the present invention there is also provided an assembly for forming indentations or perforations in a web of polymeric film, comprising:
 a film unwinding station;
 a film treatment station including a structure as described above; and
 a film rewind station located downstream of the treatment station.

Preferably, the assembly also includes at least one, and preferably a plurality of printing stations. Further, the assembly may beneficially include stations for film lamination after treatment, slitting, or post processing such as the manufacture of bags from the finished film.

Other preferred features of the apparatus will be apparent from the description of the methods outlined above.

According to the present invention there is also provided a film produced by any of the methods or the assembly described above. These films can be used as controlled atmosphere films or controlled tearing films. Another possible application for the films is use as a breathable textile. In this application, the film may be laminated with one or more other layers of material such as a fabric.

Preferably, the polymeric film has a thickness of 120 μm to 8 μm. When indentations as opposed to perforations are formed in the film, it is preferred that the indentations extend into the film a distance of up to 80% of the total film thickness.

As will be shown with reference to the preferred embodiments, the perforations formed in the film may not be circular, and may be slit-shaped or irregular in shape. However, it is preferred that the area of the openings (ie at least 80% of the openings) in the film be equivalent to a circular opening of diameter 25 μm or less (as measured by the MOCON oxygen transmission tester).

Preferably, the polymeric film is a polyolefin film. One particularly suitable polymer for forming the films according to the present invention is polyethylene.

According to the present invention there is also provided a structure of the configuration described in general terms in the methods outlined above. As noted above, the projections of this structure may be of a wide range of configurations, the one notable exception being that the projections cannot be pinpoint projections since a pinpoint projection does not have multiple contact points and therefore does not have the capacity to create a deformation or rupture in the film that is of a significantly smaller width than the diameter of the projection.

The applicant has found that a mould for creating a structure of this configuration can advantageously be manufactured by utilising laser irradiation to generate a mould from a blank block of material. The blank can be made of any suitable material, such as plastic, ceramic, single crystal silicon or metal. Preferably the blank is made from a laser-machinable polymer. Examples include polyvinyl chloride, polyethylene terepthalate, polyimide, polycarbonate and polyacrylates (such as polymethylmethacrylate) This mould can then be electroplated to generate the structure.

In one embodiment of the invention, the projections include a rim or margin that is of a greater height than the central part of the projection inside the rim or margin. The corresponding mould to form this structure should conveniently be formed with cavities that are deeper in the edge or margin regions. Such a mould can be made by laser micromachining of a blank, as described above. During laser ablation, a deeper margin region effect is obtained when the plastic towards the edge of the cavity absorbing the laser radiation explodes away. Due to the presence of plastic in the surrounding area, the explosion creates a deeper crevice in the margin region of the cavity.

In one optional form of the structure of the invention, the structure includes a substrate and an array of upstanding projections, said projections including a jagged rim or margin defining an upper edge of the projection.

In one embodiment of the invention, the projections include a central axially hollowed region. The hollowed region may extend through the full height of the projections, or may extend axially only part way through the projections. Accordingly, it becomes possible for the structure to form suitably small perforations and indentations in a film at high speeds for the creation of a low cost controlled atmosphere film.

Preferably, the structure is in the form of a roller.

Preferably, a series of structures in the form of plates are produced and are assembled together to form the outer surface of a roller.

According to the present invention, there is also provided a method of producing a structure having an array of projections suitable for pressing against a film to produce deformations or ruptures in the film, the method comprising:
  producing a mould including an array of elements of dimensions corresponding to the projections of the structure; and
  electroplating the mould with electroplating material to produce the structure.

Preferably, the projections are between 5 μm and 1 mm in height.

Preferred mould forming techniques have been described above.

The mould may be of a variety of different constructions. In one embodiment of the invention, the elements may be a series of protrusions that may be coated with the electroplating material on their surface to form a thin sheet of electroplating material on the mould. This sheet can then be removed from the mould. The protrusions will therefore be of a similar size to the intended projections of the indenting or penetrating structure, or a little smaller. The metal sheet thus produced will have a series of hollow projections. This metal sheet may be used directly as the structure, or it could be used as a "mother plate", and a number of "daughter plates" can be generated from this plate.

In another embodiment of the invention, the elements may be a series of cavities of size corresponding at least substantially to the dimensions of the projections of the desired resultant structure, and the electroplating material is plated onto the surface of the mould and into the cavities.

This second mould type can be electroplated in two different ways to form two different structure types. According to one embodiment of the invention, this technique of producing the structure can be utilised to provide the type of structure described above which includes an array of upstanding projections that have jagged rims defining upper edges of the projections. According to this embodiment of the invention, insufficient material is electroplated onto the mould to fill the mould cavities thereby resulting in the formation of a structure including a substrate and an array of upstanding projections having jagged rims defining upper edges of the projections.

Preferably, the cavities of the mould are of a size and have a ratio of depth to width such that electroplating of the mould with metal does not result in complete filling of the mould cavities with metal.

It has been found by the present applicant that, when using electroplating techniques to form a structure suitable for pressing into a polymeric film to provide suitably sized pores to form a breathable film, if the ratio of depth to width of the cavities (i.e. the aspect ratio) for these very narrow cavities is significantly high, it is not possible for metal being electroplated into the cavity to fill the cavity. This results in the formation of projections having a jagged upper rim having height corresponding to the depth into the cavity to which metal can be thrown in the electroplating operation.

Preferably, the side walls of the cavities of the mould are corrugated so as to receive and support the deposition of electroplated metal.

The present invention will now be described in further detail with reference to the accompanying drawings in which:

FIG. 1 is a perspective view of a section of a penetrating structure of a first embodiment of a first aspect of the invention illustrating the projections;

FIG. 2 is a schematic cross-sectional view of one preferred method of forming the penetrating structure illustrated in FIG. 1;

FIG. 3 is a schematic side profile of a projection of the penetrating structure illustrated in FIG. 1;

FIG. 4 is a schematic side profile of an alternative form of projection for the penetrating structure of the first aspect of the invention;

Figure 5A:
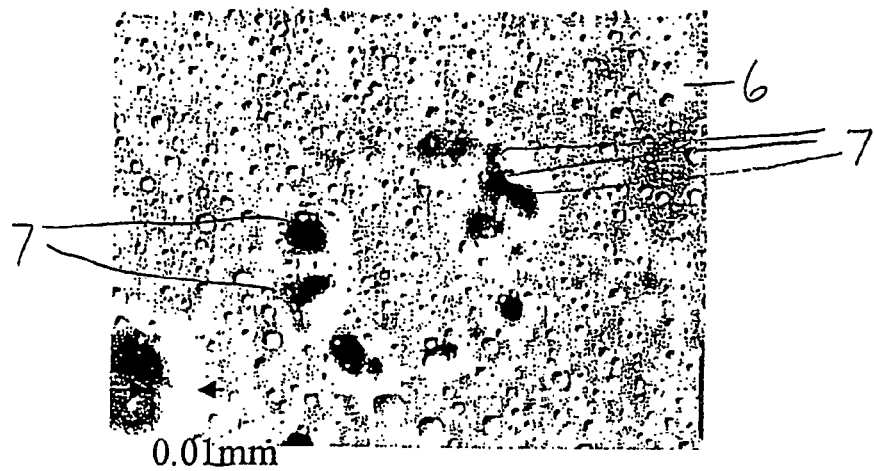
FIG. 5 is a scanning electron micrograph of a sheet of polyethylene film which has been pressed against the penetrating structure illustrated in FIG. 1, with FIG. 5(a) illustrating the reverse face of the film, FIG. 5(b) illustrating a section of the film 10 μm into the film depth, and FIG. 5(c) illustrating the top face of the film.

During the course of investigating techniques for forming microperforations or indentations in polymeric films, the present applicant has tested a variety of structures and assessed the films produced after being pressed against the structures. All structures investigated contained multiple contact points, which, when fixed against the film, caused deformation or rupture of the film. The properties and configuration of the film in the area of the perforations and immediately surrounding the perforations was investigated using a number of analytical techniques. Although not wishing to be bound by theory, the results appeared to indicate that the films formed from the structures having jagged projection may have a different configuration to the films produced from a structure having a more blunt configuration. The different possible projection shapes created are described in detail below.

FIG. 1 illustrates an enlarged view of a section of a penetrating structure according to a first embodiment of the invention. The penetrating structure includes a substrate 1 in the form of a metal plate or sheet and an array of upstanding projections 2. Each projection includes a jagged rim 3 defining the uppermost peripheral edge of the projection 2. The configuration of each projection includes multiple contact points which, when pressed against a film, will fix the film and cause minute deformations or ruptures in the film surface.

The projection 2 of the penetrating structure of the first preferred embodiment of the invention is illustrated schematically in FIG. 3. From this figure, it can be seen that the projection is substantially frusto-conical, and includes a central axially hollowed region. The upper rim of the projection 2 has an unevenly jagged formation. According to an alternative embodiment of the invention illustrated in FIG. 4, this upper rim of the projection 3' may be angled. As can be seen with reference to the figures, the projections have the appearance of a volcano, with angled sides and a jagged upper rim or margin.

This penetrating structure and the other structures of the preferred embodiments of the invention are generated by:
producing a mould 4 including an array of elements (such as cavities, 5) of dimensions corresponding to the projections 2 of the resultant structure; and
electroplating the mould 4 with electroplating material to produce the structure.

According to the first preferred embodiment of the invention, the penetrating structure is produced by generating a mould 4 including an array of cavities 5, which is electroplated with a suitable metal to form the penetrating structure thereon.

The structure so-formed may be used directly as the penetrating structure, or may be used as a "mother plate" from which a number of "daughter plates" are generated. These daughter plates are bent into a roller configuration and are then used as the penetrating structure.

The mould is formed by taking a block of polycarbonate and micromachining cavities in the block of polycarbonate by laser ablation. Micromaching by using laser ablation has not, to the knowledge of the applicant, been used for creating structures with the level of micro-detail required to practice the present invention. An EXCIMER laser was used for this purpose.

This mould is then electroplated with an appropriate metal. In this embodiment of the invention, during the electroplating operation, insufficient metal was electroplated onto the mould to fill the mould cavities, thereby resulting in the formation of a penetrating structure having the configuration illustrated in FIG. 1. The electroplating operation can be controlled to ensure insufficient material is electroplated onto the mould by designing the cavities of the mould to be of a size and having a ratio of depth to width such that the electroplating operation is incapable of throwing metal to the deepest region of the cavities. In the preferred embodiments illustrated with reference to FIGS. 1-10, the width of the cavities is approximately 50 μm, and the depth of the cavities is approximately 70 μm. After electroplating, the approximate height of the jagged upper rims of the projections was approximately 10 μm.

As illustrated in FIG. 2, the electroplating operation may result in closing of the central axial region of the projections 2. However, it will be understood to persons skilled in the art that the central region will not necessarily close up and may remain hollow through the height of the projections 2. Whether or not the central axial region of the projections will remain hollow will depend on the aspect ratio, that is, the ratio of depth to width of the cavities of the mould.

A variety of possible cavity shapes for the moulds are illustrated in FIGS. 6 to 9.

Figure 6:
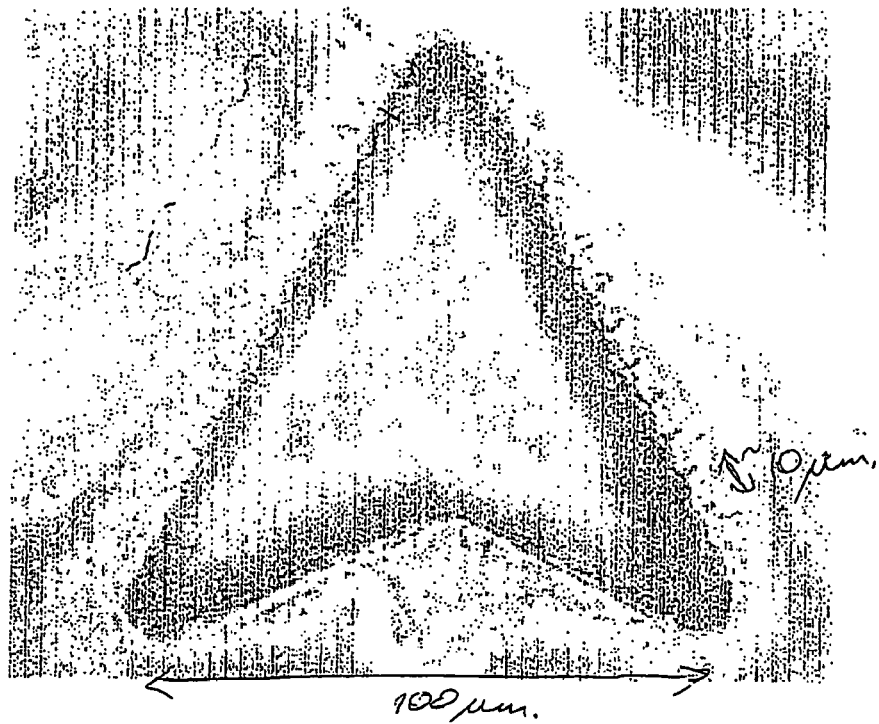
FIGS. 6, 7, 8 and 9 illustrate cross sectional views of alternative cavity configurations for forming alternative structures according to various alternative embodiments of the invention.

In FIG. 6 it is shown that the cavities may be chevron-shaped, and may have corrugated side walls. The corrugations are only approximately 8-10 μm wide. These corrugations are generated by fine micromachining using laser ablation. It will be appreciated by persons skilled in the art that a very high level of control is required to obtain the fine corrugated wall effect using laser ablation.

These corrugations facilitate the production of projections having evenly jagged or serrated upper rims. Each of these projections accordingly has a number of contact points that provide a non-uniform pressure distribution across the film when the structure is pressed against the film. Rupture will occur between some of these contact points where the strain applied is great enough, and between other contact points deformation will occur. Since the pressure differences are greatest between the contact points of the one projection, these deformations and/or ruptures (ie a perforations) will be generated within the diameter of the perforation.

Figure 7:
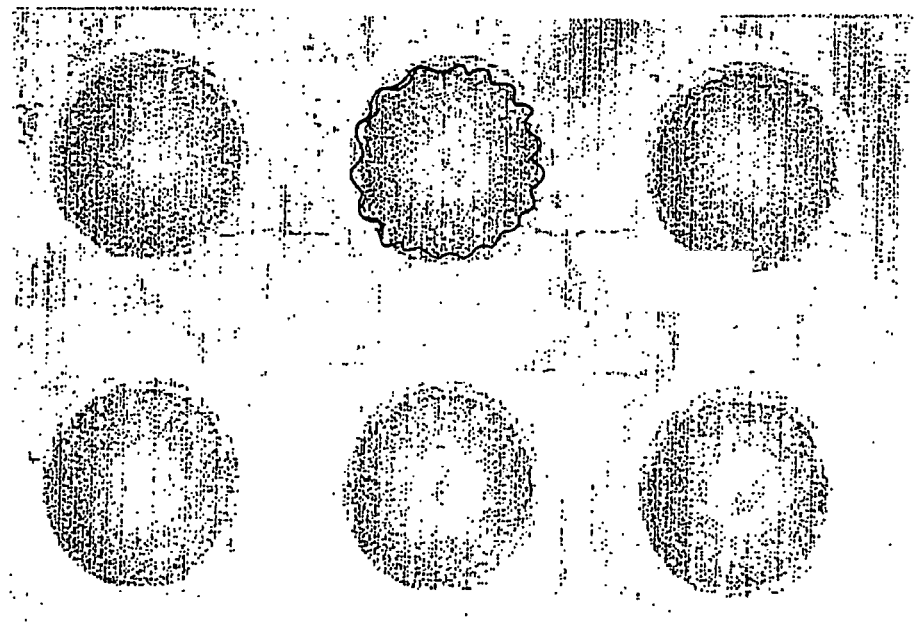

FIG. 7 illustrates a conical cavity having corrugated walls.

Figure 8:
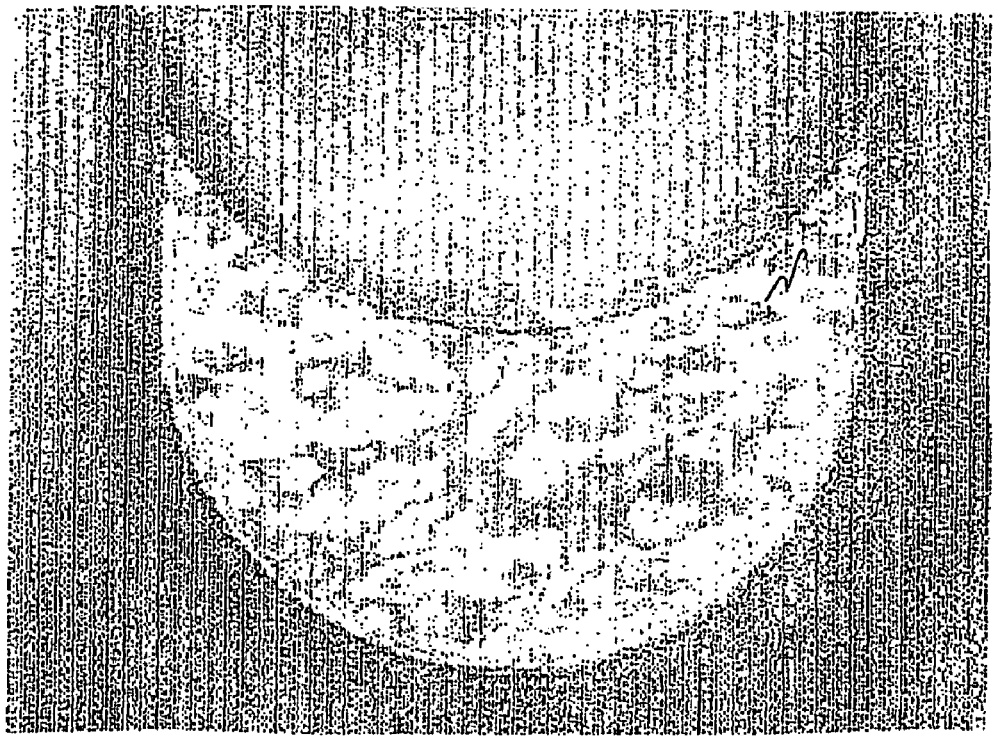

FIG. 8 illustrates a crescent-shaped cavity having corrugated walls.

Figure 9:
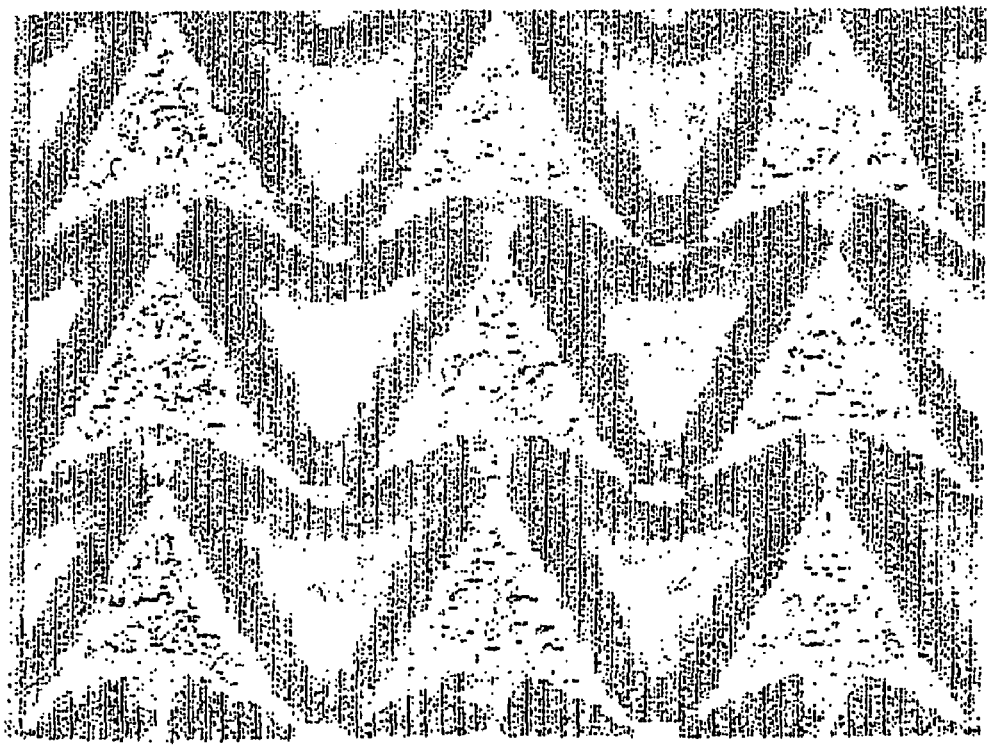
Figure 10:
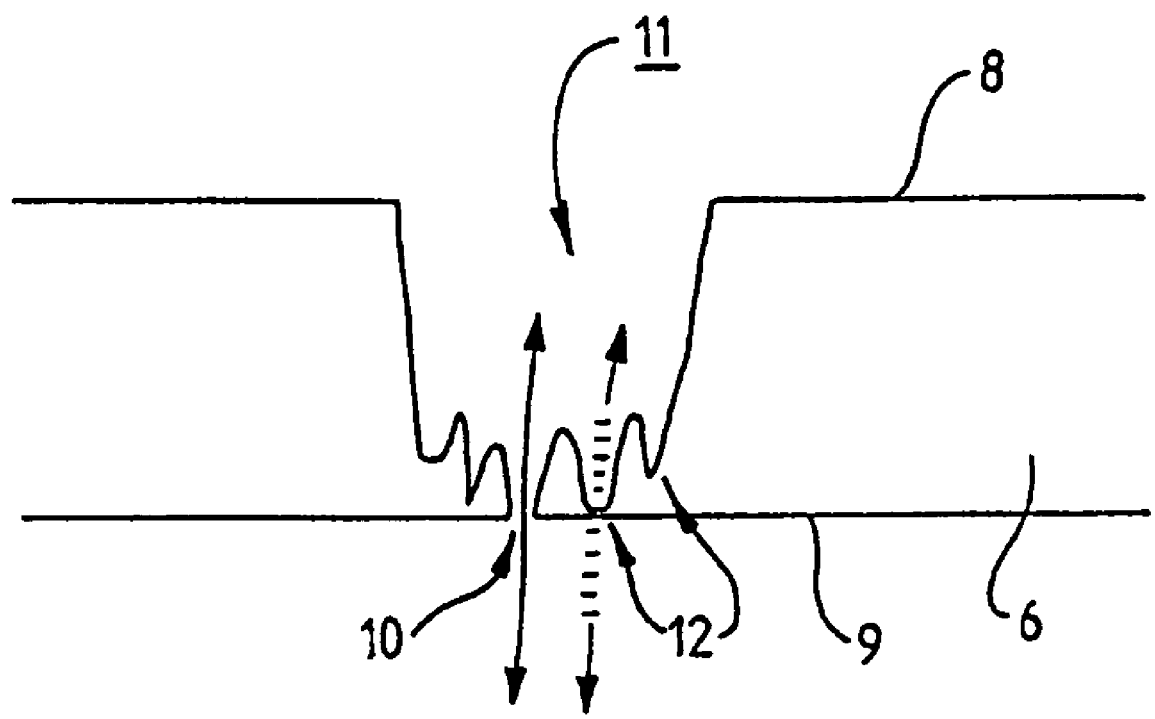
FIG. 10 is a schematic cross-sectional view of a sheet of polyethylene film that has been pressed against the structure illustrated in FIG. 1.
Figure 11:
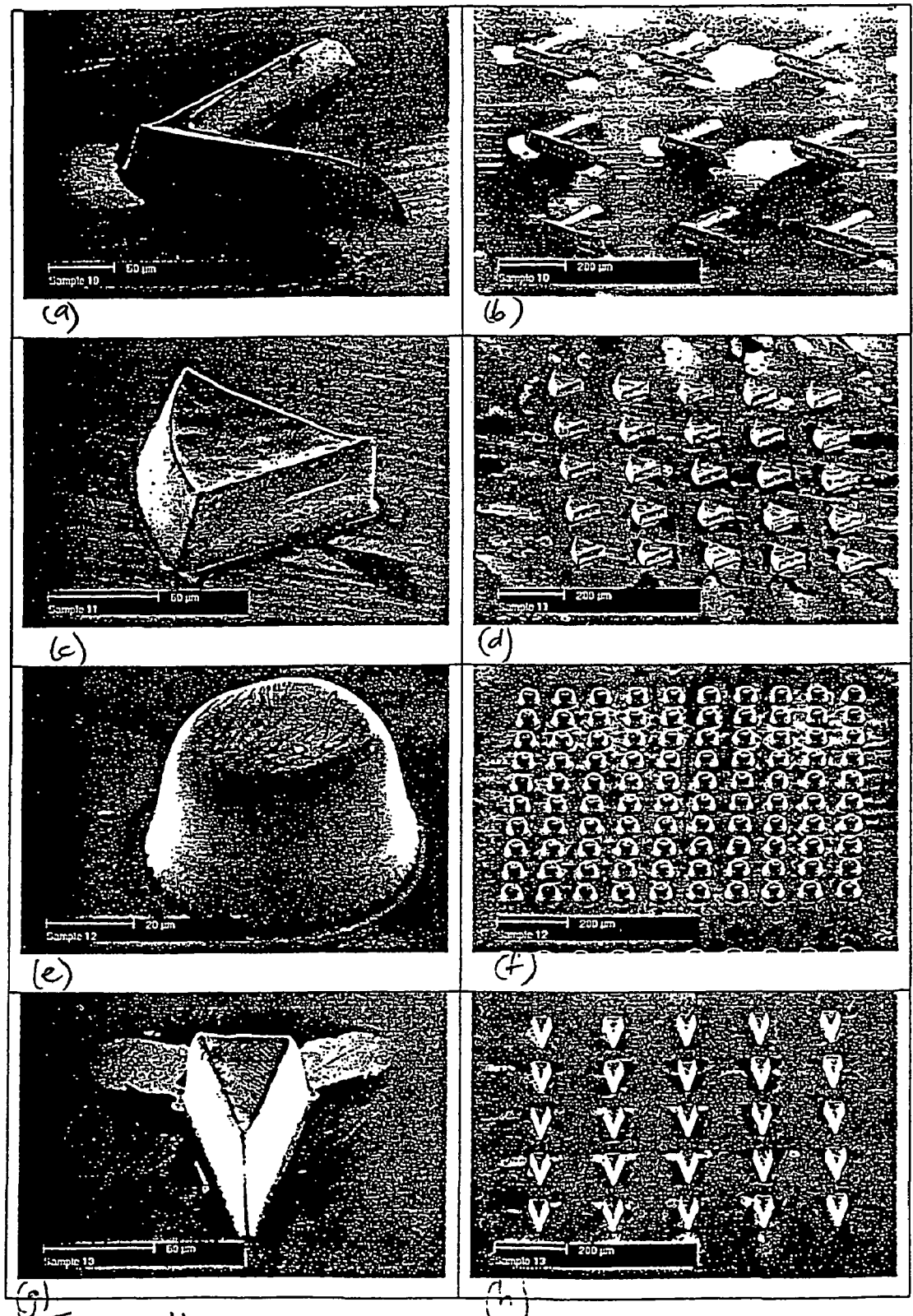
FIGS. 11a-11h, 12a-12f, 13a-13h, 14a-14h, 15a-15h and 16a-16f are electron micrographs of various indenting or penetrating structures according to the present invention.
Figure 12:
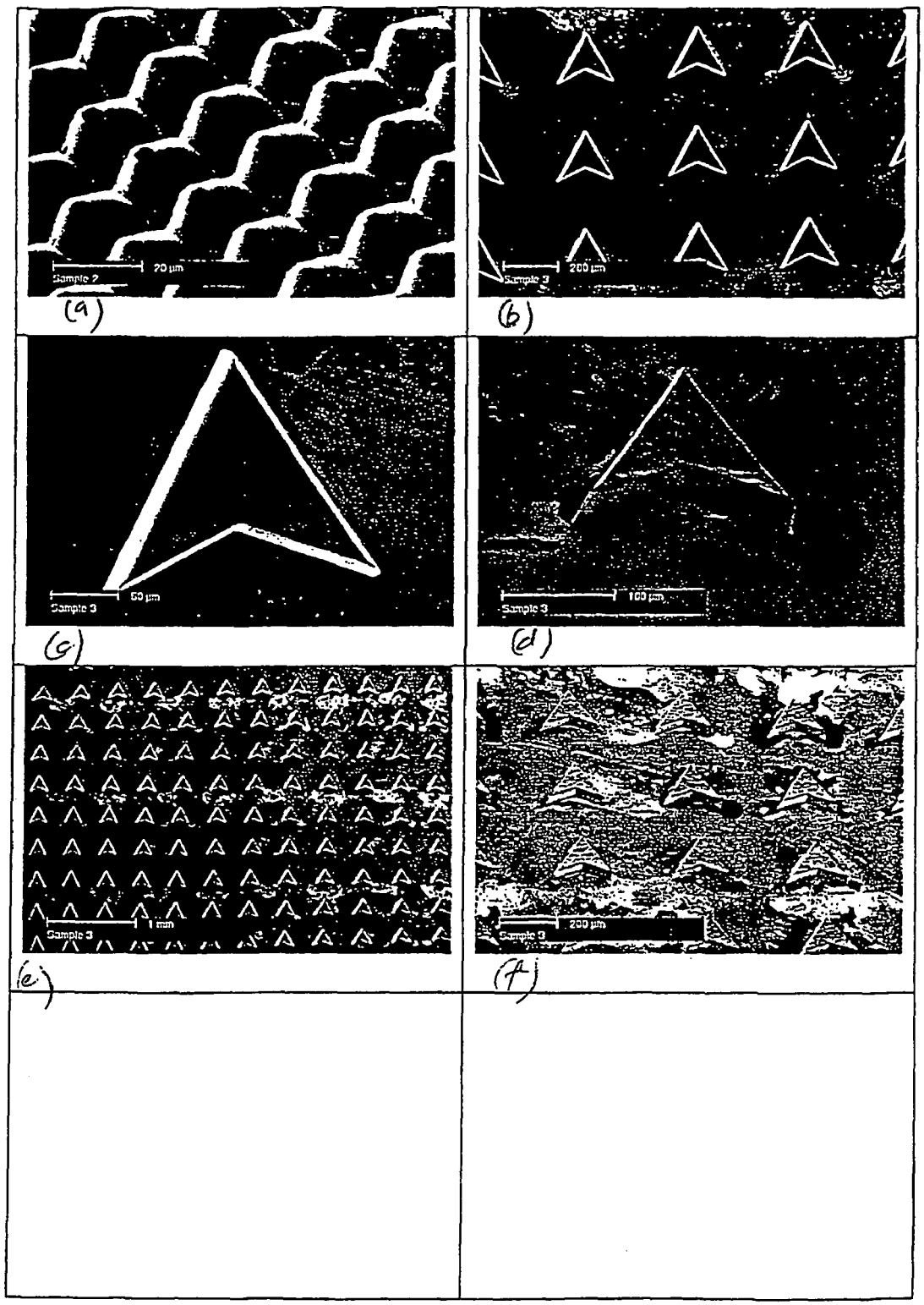
Figure 13:
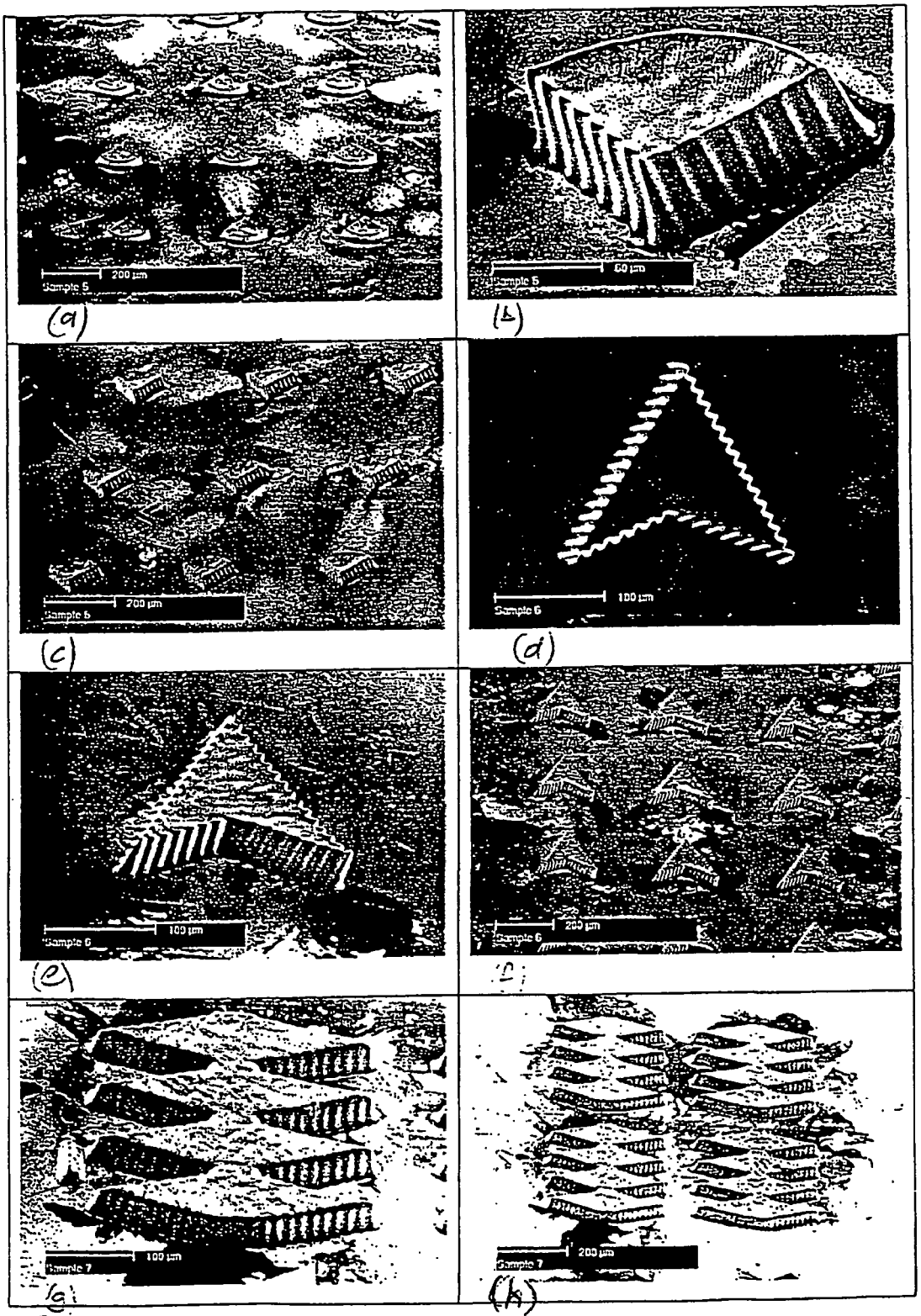
Figure 14:
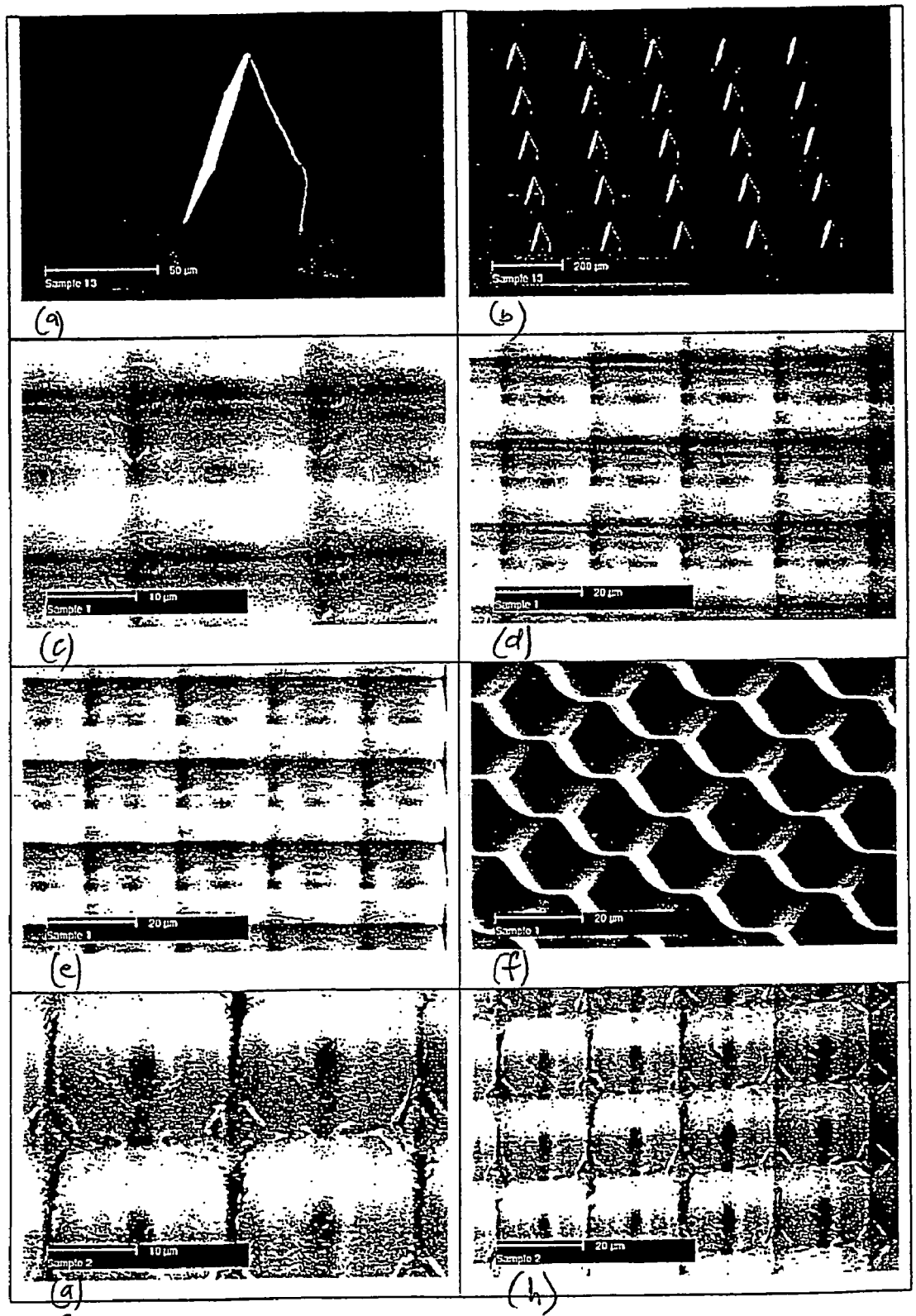
Figure 15:
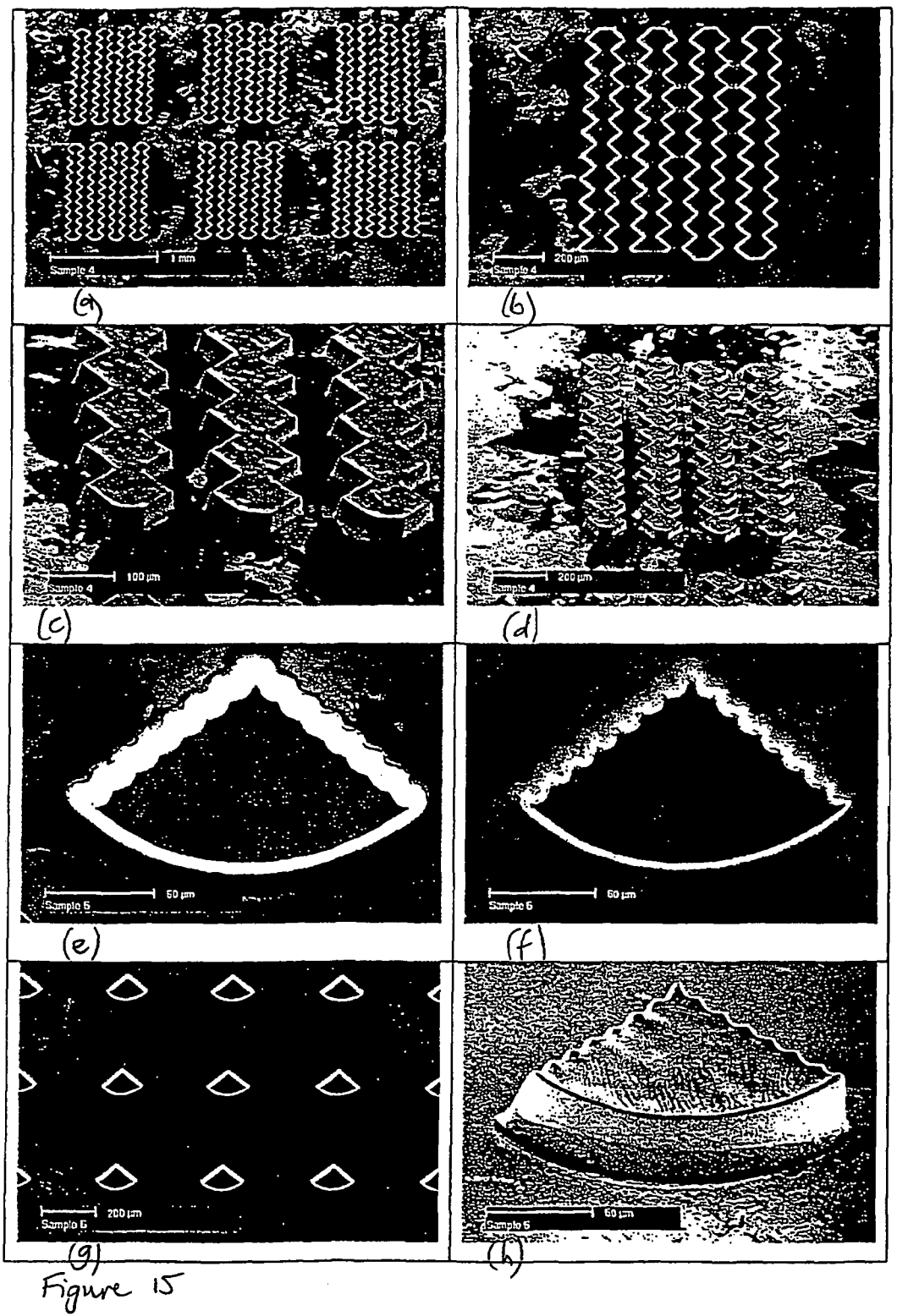
Figure 16:
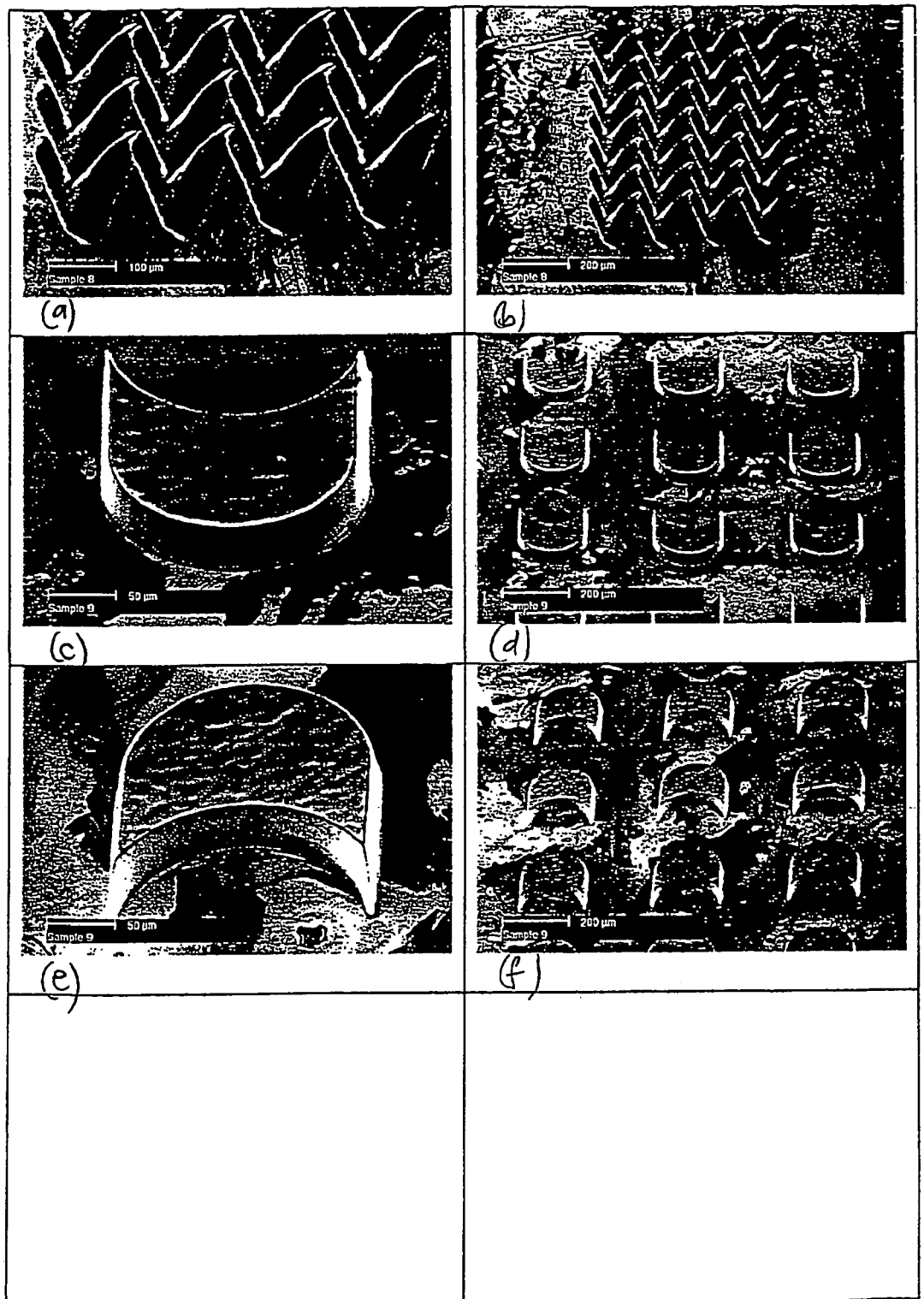

FIG. 9 illustrates cavities of chevron or triangular shape in an alternative staggered arrangement.

A series of structures in the form of plates can be produced and assembled together to form the outer surface of a roller. Thereafter, the roller can be utilised in an assembly for forming deformations (eg. indentations) or ruptures in a web of polymeric film. The example of one assembly illustrated in FIG. 21 includes a film unwinding station 13 at which a web of polymeric film 14 is unwound, and a film treatment station 15 including a roller 16 or structure as described above. Following the film treatment station is a film rewind station 17. In one arrangement, the treatment station may be incorporated into an assembly for manufacturing a product formed from breathable polymeric film, such as a food package or diaper. In the arrangement illustrated, the assembly may include a printing station 18, which may be one of a series of printing stations. In the case where the assembly is used to form a controlled-tearing film, preferably the print is indexed with the projections on the roller so that the tear-line is located at an appropriate position with respect to the printed material.

The roller 16 forms one of a pair of rollers between which the polymeric film passes so as to effect perforation at high throughputs. The structure of this configuration is capable of perforating the polymeric film at a rate in excess of 300 meters per minute. The material used for the outer surface of the backing roller 19 of the pair of rollers is a resilient material such as a rubberised elastomer or neoprene of appropriate stiffness to enable the projections of the penetrating structure to penetrate into the surface of the polymeric film.

Figure 5B:
Figure 5C:

FIGS. 5a-5c are scanning electron micrographs of a polyethylene film that has been pressed against the structure illustrated in FIG. 1. FIG. 5a is the reverse face of the film, FIG. 5b is a cross-section through the film 10 μm into the 25 μm thick film, and FIG. 5c is the top surface of the film. As illustrated, the penetrating structure was pressed into the polymeric film sufficiently firmly to generate a series of micro-sized deformations between contact points of the projections. FIG. 5a illustrates the reverse face of the polyethylene film. The dark regions correspond to regions where the contact points along the jagged upper rim of each projection have caused deformations and ruptures in the film within the area or width of the single subject projection.

FIG. 5b illustrates a cross-section through the polyethylene film 10 μm into the 25 μm thick polyethylene film. The regions marked with the numeral 7 correspond to those regions also marked by the numeral 7 illustrated in FIG. 5a.

On the top surface of the film illustrated in FIG. 5c it can be seen that these deformations or recesses do not open to the top face of the polyethylene film. Whilst none of the recesses open to the upper face of the polyethylene film in this embodiment, the pressing of the structure against the film can be controlled to ensure that the projections do go through the film to open to the upper surface of the polyethylene film. Since the jagged peaks are very narrow (only a few microns wide), the pores formed through the polyethylene film 6 are likewise very narrow.

The recessed regions that do not extend the full distance through the film leave a very small barrier of material dividing one side of the polymeric film from the other. This very thin barrier is capable of allowing gases to diffuse from one side of the film to the other at controlled rates. It is believed by the present applicants based on the SEM images that the cross-section of the film can be approximated to that illustrated in FIG. 10. As can be seen, as a result of the very narrow jagged peaks of the projections (which are only a fraction of the width of the full projection), the open pores or perforations 10 which extend through the full width of the film are very narrow (eg. 10 μm or less). The film also includes a recessed region 11 and closed pores 12 which extend part-way through the film, but do not break through the upper surface 9 of the film 6. These closed pores allow gases to diffuse across the film, as illustrated by the dashed arrow.

According to a second embodiment of the invention, an indenting or penetrating structure is formed having projections of a uniform construction.

Figure 24:
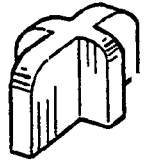
FIG. 24 is a schematic perspective view of another projection configuration for the structure of a preferred embodiment of the invention.

A variety of projection configurations for this embodiment of the invention are illustrated in FIGS. 11 to 16 and 24. The projections of some of these structures have raised or relatively sharp edges (for example, see the projection of FIG. 11c), whereas others, notably that of FIG. 24, are comparatively blunt. However, it will be noted that none of the projections are pin-point projections. The projections are in some instances chevron shaped, triangular, circular, prismatic, serrated, diamond shaped, zigzagging, cross shaped or crescent shaped, or are arranged in a honeycomb configuration. Different shapes are appropriate for different applications.

As can be seen from the shading on the electron micrographs, the projections of the indenting structures of FIGS. 11-16 have a rim or margin that is of a greater height than the central part of the projection inside the rim or margin. In some instances this margin is sharply defined, and in other instances the rim is more blunt. The body of the projection may be of a greater height than the thickness of a polymeric film that is pressed against the indenting structure. However, the difference in height between margin region and the central region of the projection is advantageously controlled to be less than the thickness of the polymeric film.

A mould for creating a structure of this configuration can advantageously be manufactured by utilising laser irradiation to generate a mould from a blank block of laser-machinable material. In the preferred embodiment polycarbonate blanks are used. Laser micromachining of the blank to create a mould having an array of cavities can be controlled so that the cavities are deeper in the edge or margin regions. During laser ablation, the deeper margin region effect is obtained when the plastic towards the edge of the cavity absorbing the laser radiation explodes away. Due to the presence of plastic in the surrounding area, the explosion creates a deeper crevice in the margin region of the cavity.

Figure 17:
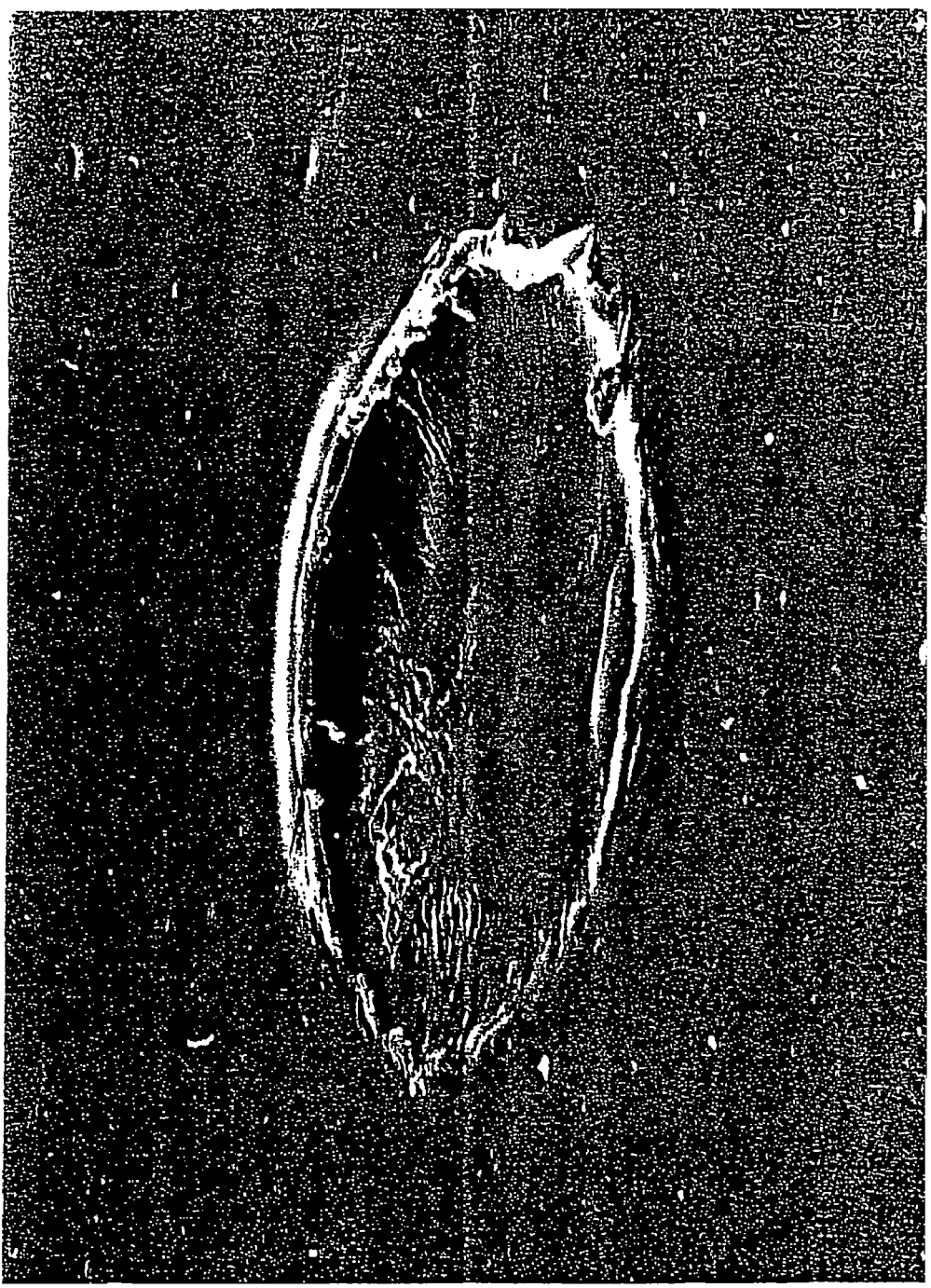
FIG. 17 is an electron micrograph of one face of a sheet of polymeric film that has had an indentation formed by an indenting structure according to the present invention.
Figure 18:
FIG. 18 is an electron micrograph of the reverse face of the sheet illustrated in FIG. 17.

Regardless of the height of the projections of the structure, the structure can be used to form indentations in a polymeric film by deforming or stretching the film between the contact points. Rupturing of the film can be avoided by controlling the spacing between the rollers (in the situation where the substrate is in the form of a roller that is mounted adjacent to a backing roller) or by otherwise controlling the pressure of application of the film against the structure. Other measures of control include but are not limited to control of the relative height of the penetrating structures and hardness of the backing material. The result using a structure having projections of oval cross-section, and sharp raised margins is illustrated in FIGS. 17 and 18. The film in this instance is a polyethylene film of a thickness of 25 μm. The sharp margin regions of the projections of the structure have formed a deeper indentation in the film, and the reverse face of the film illustrated in FIG. 18 is slightly protuberant.

Figure 19:
FIG. 19 is an electron micrograph of one face of a sheet of polymeric film that has had an indentation formed therein by the indenting structure illustrated in FIGS. 16c-16f.
Figure 20:
FIG. 20 is an electron micrograph of the reverse face of the sheet illustrated in FIG. 19.

The same result for a crescent-shaped projection is illustrated in FIGS. 19 and 20. As can be seen, the points of the crescents form contact points between which the film is stretched. In each instance, in the tests illustrated, a neoprene-coated backing plate was used to press the film against the indenting structure. In a commercial situation, the backing plate would be in the form of a roller corresponding to that illustrated in FIG. 21 (numeral 19).

With respect to the cross-shaped projection 24 illustrated in FIG. 24, it is noted that each cross 24 is 200 µm tall, 100 µm in width, and the cross-bars are 50 µm wide. The maximum diameter dimension of the cross shaped projection is approximately 200 µm. These projections 24 would ideally be spaced about the substrate with a minimum separation corresponding to the width of the projection (200 µm).

Three tools having a cross-shaped projection 24 as described above were generated and pressed into a 60 µm thick polymeric film, with a rubber backing form. Three dimensional (stereo) images of the perforations formed in the film were created to investigate the shape of the perforations created by each tool.

Figure 25:
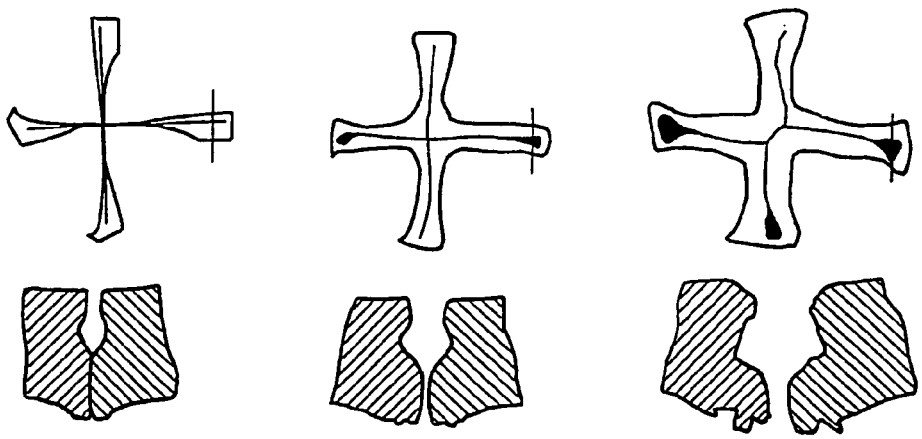
FIG. 25 is a schematic side view of 3 perforations formed from a tool having the projection configuration as illustrated in FIG. 24.

Schematic representations of the configurations of the perforation generated by the three tools are illustrated in FIG. 25. Whilst not wishing to be bound by theory, it is the conjecture of the applicant that the film is stretched by coming into contact with the projections until rupture occurs, at which point the stretched film in the area of the perforation recoils to leave a very fine (possibly curled) ribbon-like fringe of plastic around the perforation. The fine plastic fringe is believed to have the potential to partially obstruct the perforation.

This recoiling effect can be utilised in one particular embodiment of the invention to form a film having a "sieve" in the region of the perforation. According to this embodiment of the invention, the structure of the invention is pressed against a multiple-layer film, preferably a two layer film. One suitable film has 40 µm lower layer of LLDPE (liner low density polyethylene) and a 20 µm upper layer of BDPP (biaxially oriented polypropylene). This film is perforated by pressing a structure of the present invention against the LLDPE surface of the film. The tool stretches the two layers of plastic until the point where the films rupture. The LLDPE layer of film stretches significantly prior to rupture, and recoils to form a curled spagetti-like web of material which is trapped under the (also perforated) upper BOPP layer, so that the film contains a perforation with a trapped internal "sieve" of curled plastic. The internal sieve of curled plastic would be capable of preventing matter of size greater than 0.45 µm to pass through the film. Accordingly, the film may advantageously provide bacterial filtering.

The structures of the present invention can be utilised to create breathable films having specific target oxygen transmission rates, with minimal liquid transmission. This has hitherto not been possible, since the perforations generated by prior art techniques were not small enough to enable the oxygen transmission rate of a film to modified incrementally to achieve the desired oxygen transmission rate. One example of how this can be achieved will now be explained.

The oxygen transmission rate for a single perforation that can be created by a specific structure in a particular film is calculated. For example, the cross-shaped projections 24 of the dimensions described above are calculated to each individually create a hole in a certain type of film that has an oxygen transmission rate of 20 cc/hole.atm.day. An unperforated film having a base oxygen transmission rate of 60 cc/100 in$^2$.atm.day (a standard unit of measurement in the field of the invention) can have the oxygen transmission rate thereof increased incrementally by 20 cc/(selected area).atm.day by creating perforations in the film with a tool having the cross-shaped projections 24 at the necessary spacing to achieve the desired oxygen transmission rate. Due to the small size of each perforation, liquid transmission across the film can be substantially avoided.

The perforated films produced in accordance with the present invention can be further distinguished from the prior art perforated films by virtue of the surface properties of the film. Prior art perforated films usually have a hydrophilic surface as a result of the procedures used to form the films, even if the film prior to perforation was hydrophobic in nature. In contrast, the perforating technique of the present invention does not modify the surface properties of the film. As a consequence, a film having a hydrophobic surface can be obtained. Such a film is particularly useful in applications where the film is required to provide a barrier to liquid transmission, whilst allowing gas transmission to occur.

The strucures of the present invention may also be utilised to form indentations in a film. Indentations may be formed in a film for a variety of purposes. Indentations may be desired to modify the texture or roughness of a film to make the film suitable for certain applications. Alternatively, astructure having a linear arrangement of projections could be used to create indentations in a film in a line, to thereby create a line of weakness in the film.

Biaxially oriented films are difficult to tear in a desired direction. Sometimes a line of perforations is formed in polymeric packaging films to assist in opening the packaging film, however such perforated lines cannot be used when packaging products such as food products that cannot come into contact with the outside atmosphere. By providing a line or linear arrangement of indentations in one surface of a polymeric film, it becomes possible to create a controlled-tearing film. This may be applied to laminated films optionally including a metal foil layer. The polymeric film side of the laminate may be provided with indentations that do not extend into the metallic film layer of the laminate.

Figure 21:
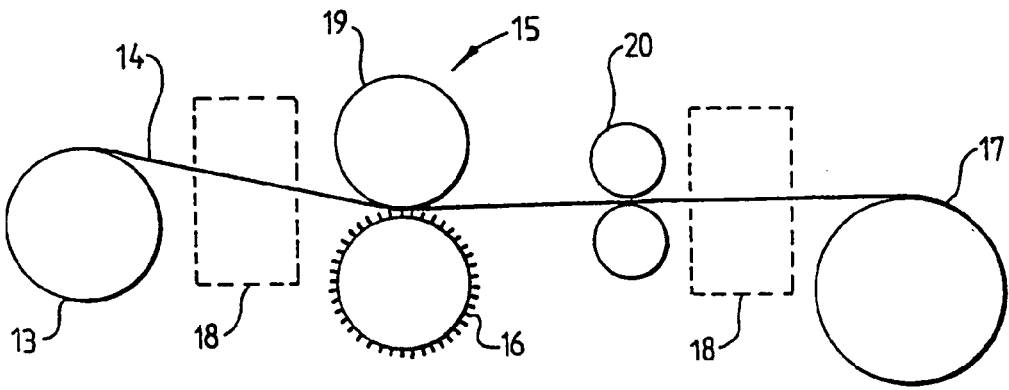
FIG. 21 is a schematic view of the assembly for forming perforations in accordance with one embodiment of the invention.

The assembly illustrated in FIG. 21 includes an additional station suitable for conducting the method of a particularly preferred embodiment of the invention. This embodiment of the invention involves (a) providing a web of thermoplastic polymeric film such as polyethylene film, which is unwound at a film unwinding station 13;

(b) forming perforations in the film at a film treatment station 15 which includes roller 16 and a backing roller 19;

(c) heating the film to a temperature greater than or equal to its softening point and at least partially re-sealing the perforations to at least reduce the size thereof in a re-sealing station 20.

This film may also be printed in a printing station 18 which may be positioned before or after the penetrating and re-sealing stations. Finally, the film may be rewound or alternatively the film may proceed to further processing to construct an appropriate end product.

The re-sealing station includes a pair of heated nip rollers. The film is heated by and pressed between the nip rollers to thereby at least partially re-seal the perforations.

Figures 22, 23:
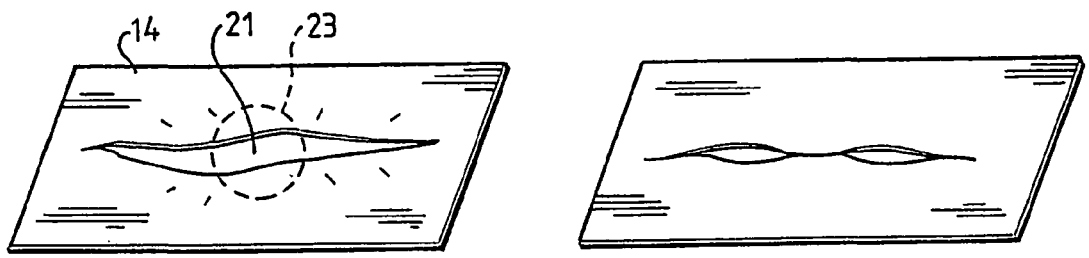
FIG. 22 is a schematic perspective view of a section of film with one elongate perforation formed in one part of the assembly of FIG. 21.
FIG. 23 is a schematic perspective view of the section of film illustrated in FIG. 21 following re-sealing in the assembly of FIG. 21.

The re-sealing operation is illustrated schematically with reference to FIGS. 22 and 23. FIG. 22 illustrates an elongate perforation 21 that is formed in a sheet of the polymeric film 14. The perforation illustrated in FIG. 22 is a rough approximation of the type of perforation that may be obtained when the projection that formed the indentation illustrated in FIG.

19 is pressed to break through the polymeric film. A slight fringe-effect is obtained from the edges of plastic surrounding the elongate perforation.

When the polymeric film bearing these perforations is passed through the heated nip rollers 20, the perforations are at least partially re-sealed to at least reduce the size thereof. As illustrated in FIG. 23, the two resultant perforations formed following the re-sealing step 22 are approximately ⅕ of the size of the original perforation 21.

For the avoidance of any doubt, it is to be understood that the perforations can be of any regular or irregular shape. In the case of irregular-shaped perforations, such as that illustrated with reference to numeral 21 in FIG. 22, it is to be understood that the cross-sectional area of this perforation will correspond to a circular perforation represented by the broken line 23. Any references to the size of a perforation in terms of a diameter is to be taken to require that the subject perforation has an area that corresponds to a circular perforation of an equivalent area with the subject diameter.

Many modifications may be made to the preferred embodiments described above without departing from the spirit and scope of the invention.

The claims defining the invention are as follows:

1. A method for treating a film, comprising:
   providing a web of polymeric film having a front face and a reverse face,
   providing a structure including a substrate and an array of upstanding projections having an average width dimension of less than 200 μm, each projection including multiple contact points that are positioned to produce a non-uniform pressure distribution when film is stretched between the contact points of a projection,
   providing a backing form made from a resilient material of appropriate stiffness to enable the projections to penetrate into or through the surface of the film, and
   pressing the film between the projection-bearing surface of the structure and the backing form a sufficient distance to fix the film against the contact points and creating a non-uniform pressure distribution across the film in the region between the separate contact points in a projection and causing rupture of the film between the separate contact points in the projection while the film is fixed without heating the structure or the film during the pressing step.

2. A method for treating a film according to claim 1, comprising rupturing the film to form perforations in the film having a size such that at least 80% of the perforations formed in the film have an effective aperture of less than or equal to 25 μm measured using the MOCON oxygen transmission tester calibrated against a film of the defined size.

3. The method of claim 2, wherein the perforations create a line of weakness in the film.

4. The method of claim 2, wherein the perforations create a controlled tearing film.

5. The method of claim 2, wherein the width of the perforations formed by the perforation forming step are smaller than the width dimension of the projections.

6. A method for treating a film according to claim 2, wherein at least 80% of the perforations formed in the film have an effective aperture of less than or equal to 10 μm.

7. A method for treating a film according to claim 1, wherein the pressing step involves pressing the structure into the polymeric film a sufficient distance to create perforations in the film in a line, to thereby form a line of weakness in the film.

8. A method for treating a film according to claim 1, wherein the backing form has an outer surface that is between 40 and 100 as measured by the Shore A hardness test.

9. A method for treating a film according to claim 1, wherein the structure is mounted onto, or is in the form of, a roller or a platen, and the pressing step is conducted as a continuous process.

10. A method for treating a film according to claim 9, wherein structure is mounted onto or in the form of a roller and the pressing step involves passing the film between the roller form of the structure and a backing roller.

11. A method for treating a film according to claim 10, wherein the roller form of the structure and the backing roller are indexed relative to one another to reduce the spacing therebetween, or to increase the pressure of application of the film against the structure, as the projections are worn down over time.

12. A method for treating a film according to claim 1, wherein the projections of the structure have an average height of between 5 μm and 250 μm.

13. A method for treating a film according to claim 12, wherein the projections of the structure have an average height of between 10 μm and 200 μm.

14. A method for treating a film according to claim 12, wherein the projections of the structure have an average height of between 10 μm and 100 μm.

15. A method for treating a film according to claim 1, wherein the average maximum width dimension of the projections is less than 150 μm.

16. A method for treating a film according to claim 1, wherein the average maximum width dimension of the projections is less than 100 μm.

17. A method for treating a film according to claim 1, wherein the projections of the structure include a rime or margin that is greater height than the central part of the projection inside the rim or margin.

18. The method of claim 1, wherein the projections of the structure pressed into the polymeric film are separated by a distance that is equivalent to or greater than the width of the projection.

19. The method of claim 1, wherein each projection is cross-shaped.

20. The method of claim 1, wherein each projection is of a height between 100 μm and 300 μm and has a maximum width of between 50 μm and 150 μm.

21. The method of claim 20, wherein each projection has a height that is greater than its maximum width.

22. The method of claim 1, wherein the projections contain cut-away regions between the contact points down which the polymeric material can be drawn to create uneven pressure distribution between the contact points and rupture between the contact points.

23. A method for treating a film according to claim 1, wherein the web of polymeric film is a laminated film.

24. A method for treating a film according to claim 1, wherein the web of polymeric film comprises a layer of a laminated film.

* * * * *